United States Patent [19]
Affa

[11] Patent Number: 5,551,163
[45] Date of Patent: Sep. 3, 1996

[54] LOW-VIBRATION FASTENING FOR THE HOUSING OF A POSITION MEASURING ARRANGEMENT

[75] Inventor: Alfred Affa, Stein/Traun, Germany

[73] Assignee: Dr. Johannes Heidenhain GmbH, Traunreut, Germany

[21] Appl. No.: 396,136

[22] Filed: Feb. 28, 1995

[30] Foreign Application Priority Data

Mar. 2, 1994 [DE] Germany .......................... 44 06 798.4

[51] Int. Cl.$^6$ .................................................. G01B 11/04
[52] U.S. Cl. ................................................ 33/702; 33/706
[58] Field of Search .............................. 33/702, 706, 707, 33/708, 703, 704

[56] References Cited

U.S. PATENT DOCUMENTS

| | | |
|---|---|---|
| 4,169,316 | 10/1979 | Ernst . |
| 4,170,829 | 10/1979 | Nelle . |
| 4,198,757 | 4/1980 | Nelle et al. . |
| 4,320,578 | 3/1982 | Ernst . |
| 4,479,304 | 10/1984 | Nelle . |
| 4,492,032 | 1/1985 | Nelle . |
| 4,509,262 | 4/1985 | Nelle . |
| 4,530,157 | 7/1985 | Nelle . |
| 4,573,000 | 2/1986 | Nelle . |
| 4,776,098 | 10/1988 | Nelle . |
| 4,857,573 | 8/1989 | Simon et al. ............................ 524/291 |
| 5,016,359 | 5/1991 | Nagaoka et al. .......................... 33/706 |
| 5,095,637 | 3/1992 | Kraus . |
| 5,115,573 | 5/1992 | Rieder et al. ............................ 33/707 |

FOREIGN PATENT DOCUMENTS

| | | |
|---|---|---|
| 0110059B1 | 10/1983 | European Pat. Off. . |
| 0264801 | 4/1988 | European Pat. Off. . |
| 2505587C3 | 2/1975 | Germany . |
| 3509390A1 | 3/1985 | Germany . |
| 2124381 | 2/1984 | United Kingdom ..................... 33/706 |
| 2159277 | 11/1985 | United Kingdom ..................... 33/706 |

OTHER PUBLICATIONS

"Gekapselte inkrementale LängenmeBsysteme LS 706, LS 706 C," by Dr. Johannes Heidenhain, Jun. 1993.

*Primary Examiner*—William A. Cuchlinski, Jr.
*Assistant Examiner*—G. Bradley Bennett
*Attorney, Agent, or Firm*—Brinks Hofer Gilson & Lione

[57] ABSTRACT

The housing of a position measuring arrangement is fastened over length balancing elements to a first object such as a slide of a machine tool. A measurement embodiment is mounted over a highly elastic adhesive layer on an inner surface of the housing and is scanned by a scanning arrangement. In order to achieve a low-vibration fastening of the housing, it is supported in supporting zones formed between side surfaces of the housing and the exterior surface of the slide. The free length expansion between the housing and the slide is ensured by providing an elastic adhesive layer in the supporting zone.

19 Claims, 3 Drawing Sheets

5,551,163

LOW-VIBRATION FASTENING FOR THE HOUSING OF A POSITION MEASURING ARRANGEMENT

BACKGROUND OF THE INVENTION

The present invention relates to an improved fastening for the housing of a position measuring arrangement, and, in particular, a low-vibration fastening. Position measuring arrangements are used to measure the relative position of two components such as a machine tool or a coordinate measuring machine.

German Patent application no. DE 25 05 587 discloses a length measuring arrangement in which a carrier body is fastened at its ends to one of the components to be measured. The fasteners are articulately constructed. Such a construction allows the carrier body to expand freely via the fasteners relative to the component to be measured when temperature changes occur. The carrier body lies free between the fastening element whereby vibrations are made possible. Such vibrations disadvantageously affect the accuracy of measurement obtainable from a measuring arrangement so constructed.

German Patent application no. DE 35 09 390 A1 discloses a similar measuring arrangement. In addition to the elastic fastening elements at the ends of the housing there are further fastening elements therebetween. Between these fasteners, along the length of the housing, the housing is not in contact with the object to be measured. Thus, vibrations may also be introduced to adversely affect the measuring accuracy of the arrangement.

European Patent application no. EP 0 110 059 B1 discloses a length measuring arrangement with elastic fastening elements at the ends of the housing. Another fastener is located at the middle of the housing to rigidly fasten the housing to the object to be measured. As with the previously described measuring arrangements, the housing is not in contact with the object to be measured between the fasteners.

In a publication entitled "Encapsulated Incremental Length Measuring Systems LS 706, LS 706 C," by Dr. Johannes Heidenhain, June 1993, a length measuring arrangement constructed according to EP 0 110 059 B1 is disclosed. When the housing is attached to the object to be measured, portions of the surface of the housing are in physical contact with the object to be measured. Adhesive friction arises from this contact which hampers the free longitudinal expansion of the housing. Such adhesive friction also introduces measurement inaccuracies.

It is thus desirable to provide a position measuring arrangement wherein the unequal thermal properties of the carrier body and the object to be measured to which the carrier body is fastened, bring about virtually no falsifications or inaccuracies in the resulting measurements. It is also desirable to provide such a measuring arrangement wherein the carrier body is nevertheless relatively securely fastened to the object to be measured so that vibrations are not introduced.

SUMMARY OF THE INVENTION

According to a first aspect of the present invention, there is provided a length measuring instrument for measuring the relative position of a first and second object. The instrument includes a carrier body portions of which are fastened to the first object by translatory bearing fasteners. A measurement embodiment extending in a measuring direction is fastened to the carrier body. A scanning arrangement fastened to the second embodiment scans the measurement embodiment in the measuring direction. A support zone formed by a highly elastic layer is located between the first object and the exterior portion of the carrier body for supporting a surface of the carrier body.

According to a second aspect of the present invention, there is provided a method for mounting a carrier body of a length measuring instrument to a first object by applying a highly elastic layer to a side surface of the carrier body and contacting the side surface of the carrier body having the highly elastic layer to an exterior surface of the first object.

An advantage of the present invention is that a nearly unimpeded longitudinal expansion can occur between the carrier body and the object to be measured. In addition, a stable and low vibrational fastening is ensured. Such advantages are particularly relevant for long carrier bodies with small cross sections which are demanded for practical use.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS OF THE PRESENT INVENTION

Figure 1:
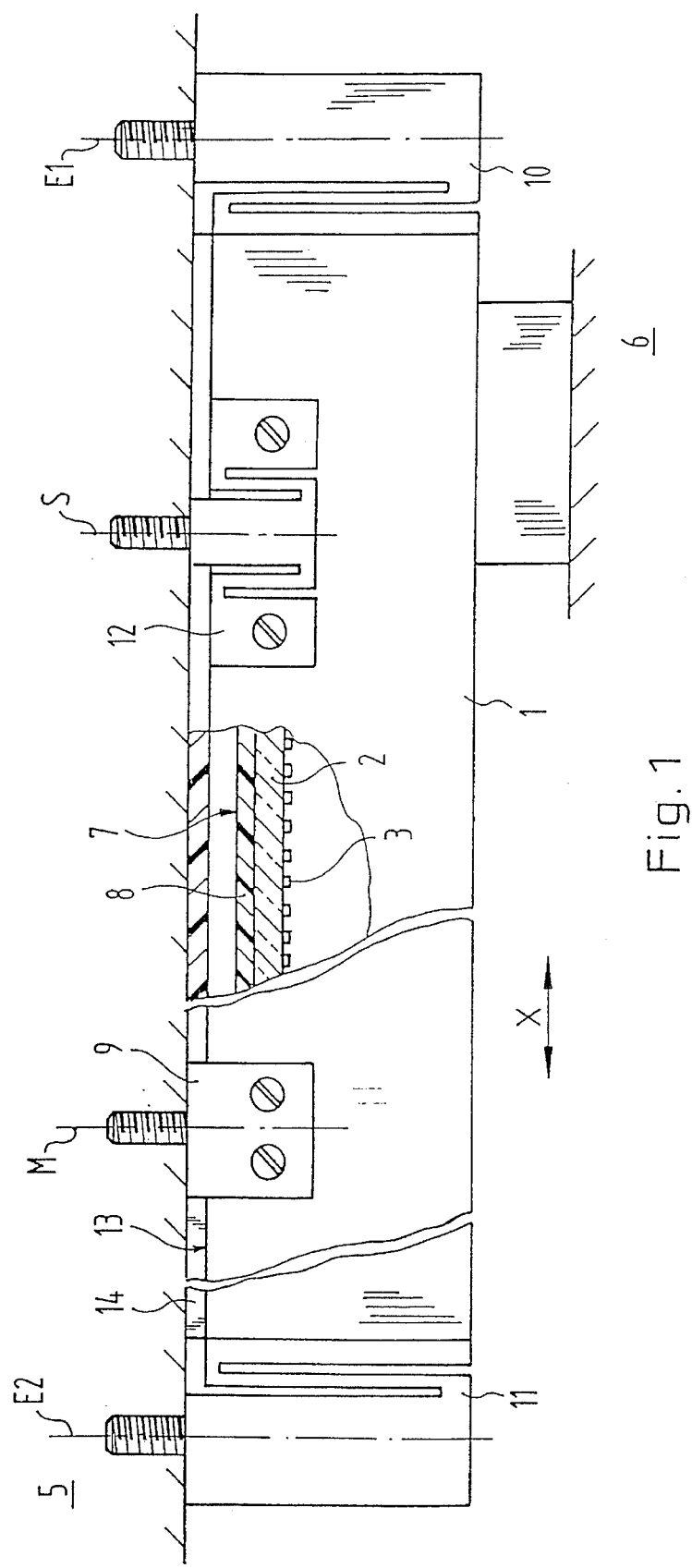
FIG. 1 illustrates an encapsulated length measuring arrangement in partial section.

FIG. 1 illustrates an encapsulated length measuring arrangement in partial section. The measuring arrangement includes a housing 1 which serves as a carrier body for a measurement embodiment 2. A graduation 3 is formed on the measurement embodiment 2. In a preferred embodiment, housing 1 is a hollow body formed of aluminum in the interior of which there is fastened the measurement embodiment 2 which is preferably formed of glass. The housing 1 is fastened to a first object 5 and a scanning arrangement 4 (see FIG. 2) is fastened to the second object 6. The first and second objects 5 and 6 are relatively movable with respect to one another and the scanning arrangement is positioned to photoelectrically scan the measurement embodiment 2. In a preferred embodiment, the first object 5 may be a slide and the second object 6 may be the bed of a machine tool.

The housing 1 has an inner surface 7 to which the measurement embodiment 2 is fastened by means of an elastic adhesive layer 8. Housing 1 is connected to the first object 5 at several locations.

In a preferred embodiment, the housing 1 is rigidly and directly connected to the first object 5 at one location, preferably at its middle M by first fastening element 9. In addition, the housing is fastened in the two end zones E1 and E2 over second fastening elements 10 and 11 to the first object 5, i.e. the slide of a machine tool. The second fastening elements 10 and 11 are formed as balancing elements which provide a limited degree of translatory movement to the ends of the housing 1 along the measuring direction X. These fastening elements 10 and 11 are rigidly secured to the first and second ends of the housing 1 and define two regions: a first region which defines a bore (not shown), and a second region which defines two opposed, parallel slits 20. These slits 20 are oriented transversely to the measuring direction X, and each of the slits is in communication with a respective opposed side of the fastening elements 10 and 11. The slits 20 run in a meander pattern oriented perpendicularly to the measuring direction. As used herein, the term "meander pattern" will be used to designate at least two partially overlapping slits arranged to create at least one band of material which is connected at opposite ends to the fastening elements 10 and 11.

The array of slits 20 provides a translatory degree of freedom for the carrier 1 along the longitudinal measuring direction. During use, changes in temperature of the carrier 1 will typically result in length changes of the carrier 1 which would, unless compensated for, generate substantial longitudinal forces on the carrier 1. The translatory degree of freedom provided by the slits 20 ensures that such thermal length changes do not generate distorting longitudinal forces on the carrier 1.

In addition, there may be additional fastening elements in the form of supporting length balancing elements 12 at positions S between the rigid fastening element 9 and length balancing elements 10 and 11. As previously described, the length balancing elements 10, 11 and 12 bring about a translatory bearing of the end zones E1 and E2 and positions S in the measuring direction X whereas the first fastening element 9 which rigidly and directly attaches the housing 1 to the first object 5 thereby preserving the middle M as a measurement reference point.

Figure 2:
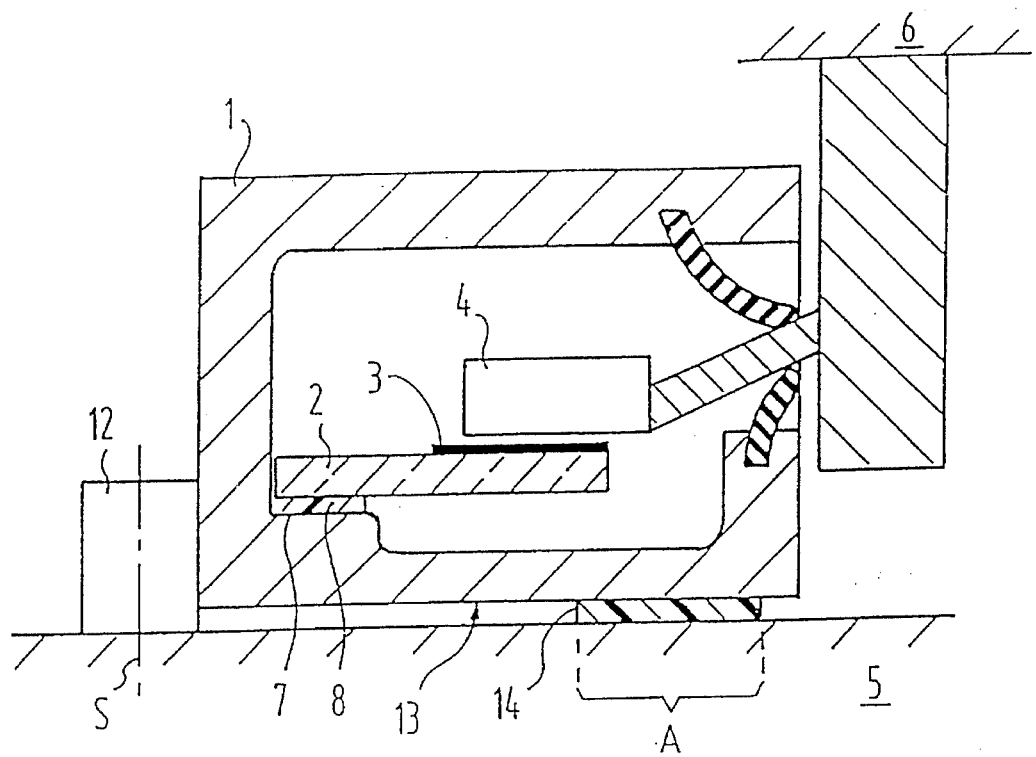
FIG. 2 illustrates a cross-sectional view of the length measuring arrangement shown in FIG. 1 according to a first preferred embodiment of the present invention.

In order to avoid vibrations of the housing 1, the housing 1 is braced with a side surface 13 on a surface of the first object 5 through a adhesive layer 14 (see FIG. 2).

FIG. 2 illustrates a cross-section 1 view of the length measuring arrangement shown in FIG. 1 according to a first preferred embodiment of the present invention. A plurality of support zones A are formed between the side surface 13 of the housing 1 and the surface of the first object 5 to which the housing is attached. The support zones are formed by a highly elastic layer 14, preferably an adhesive layer. By providing such a highly elastic layer 14 a stable support of the housing 1 on the surface of the first object 5 is ensured yet the housing 1 and first object 5 are allowed to freely expand in length due to such factors as temperature change. Thus, as temperature conditioned length changes occur between the housing 1 and the first object 5, longitudinal forces such as those conditioned by adhesive friction between the housing 1 and first object 5, which can lead to measurement errors, do not arise. In an alternate preferred embodiment, a silicone layer may be used instead of adhesive layer 14.

The scanning unit 4 is connected by means of a follower 22 with the second object 6 the position of which is to be measured. In this embodiment, the object 6 to be measured takes the form of a slide piece of a processing machine (not shown). A longitudinal slit 24 runs the longitudinal extent of the housing 1, and the follower 22 passes through the slit 24. The slit 24 is closed by sealing lips 26 which are inclined toward one another in a roof-like manner to seal the interior of the housing 1 against contaminants. The follower 24 protrudes between the sealing lips 26 as shown.

Figure 3:
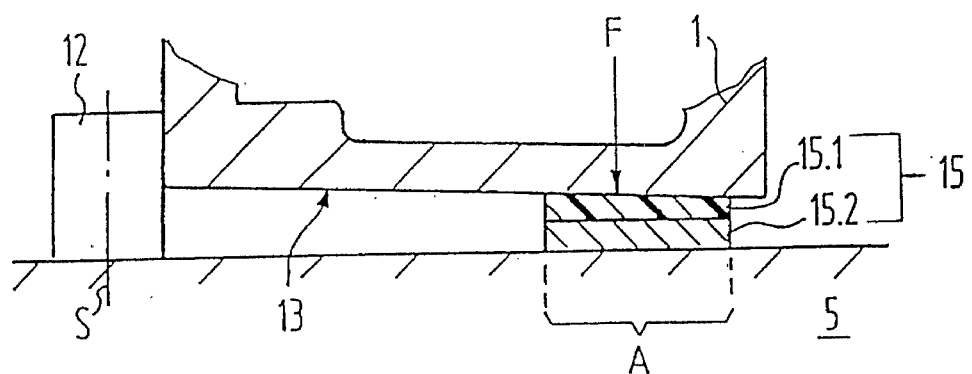
FIG. 3 illustrates a cross-sectional view of the length measuring arrangement shown in FIG. 1 according to a second preferred embodiment of the present invention.

FIG. 3 illustrates a cross-sectional view of a length measuring arrangement shown in FIG. 1 according to a second preferred embodiment of the present invention. In this preferred embodiment an adhesive foil 15 can be used instead of the highly elastic layer 14 shown in FIG. 2. The adhesive foil 15 includes an adhesive layer 15.1 and a slide layer 15.2 in the form of a protective paper. The adhesive foil 15.1 is cemented onto the side surface 13 of housing 1 with the adhesive layer 15.1 in contact with the side surface 13 and the surface of the protective paper 15.2 lies against the slide 5. FIG. 3 is shown exaggerated to show that the housing is fastened with tension so that in the support zones A, a force F is applied to the housing. The support zones are spaced away from the fastening elements 9, 10, 11 and 12 in a direction perpendicular to the measurement direction X as shown. Thus, between the support zones A and the fastening elements the side surface 13 of the housing 1 is not in contact with the first object 5. In a preferred embodiment, the highly elastic layer 14 and adhesive foil 15 are applied in strip form to surface 13 in the longitudinal direction X of the housing 1.

Thus, the side surface 13 of the housing 1 is joined to the object 5, apart from fasteners previously discussed, solely by the regions A. Thus region A, while only one region is shown it will be appreciated that there are a plurality of regions A along side surface 13, provides a support for side surface 13 on object 5 and also allows unhindered free expansion in length of the housing 1. If a support were to be effected without the elastic intermediate layer 14 then the effects of friction would hinder the free lengthwise expansion due notably to temperature changes. In addition, while such a support structure has been described with reference to a high-precision linear measuring instrument, such a support structure may also be used with other apparatus.

In addition, the width of the strip A may be chosen in accordance with given structural conditions, however, it may also cover the entire side surface 13 if desired. In another preferred embodiment, the housing 1 may be tilted somewhat by the fastening elements 9–12 to exert a biasing force F against the region A of the adhesive layer 14 and 15. The elastic intermediate layer 14 and 15 has high elasticity solely in directions parallel to plane 13 while its resilience in the direction a biasing force F is minimal in order to avoid introducing oscillations to the carrier body 1. These advantages are attained by providing a thin layer 14, 15, preferably 0.1 mm thick.

The separate fastening elements 12 and also possibly elements 10 and 11 may be eliminated especially in the case of short housings and the translatory bearing of the housing 1 is ensured solely by the adhesive layer 14 or foil 15. In such a case, the adhesive layer or foil may be applied over a larger area of the side surface 13 of the housing 10.

An advantage of using the adhesive foil 15 which has a protective cover in the form of the protective paper 15.2 is that when the housing is disassembled from the first object 5, no adhesive residue remains on the first object 5.

In yet another preferred embodiment, the length balancing elements 10, 11 and 12 can be integrated into the housing 1 or be formed directly by the housing 1.

Figure 4:
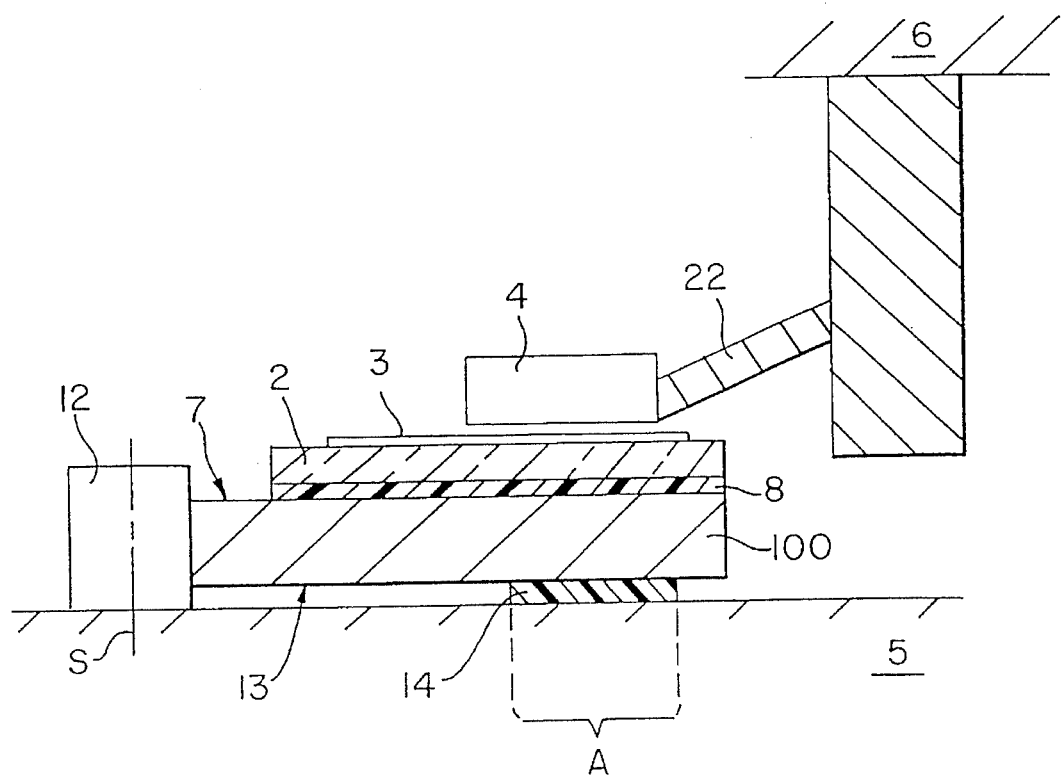
FIG. 4 illustrates a cross-sectional view of a length measuring arrangement according to a third preferred embodiment of the present invention.

FIG. 4 illustrates a cross-sectional view of a length measuring arrangement according to a third preferred embodiment of the present invention. Instead of utilizing a hermetically encapsulated housing 1 as shown in FIGS. 1–3, it is also possible to utilize a single rail 100 as the carrier body as shown in FIG. 4. Such a linear measuring instrument is referred to as an open measuring instrument in contrast to an encapsulated measuring instrument. The same reference numerals have been used to describe like elements and thus need not be described in detail again. In addition, while adhesive layer 14 is illustrated, an adhesive foil 15 may be used in its place. In such a case the measurement embodiment 2 is fastened directly to the first object 5 according to the present invention, i.e. adhesive layer 14 or adhesive foil 15 attaches the measurement embodiment 2 to the first object 5.

In a preferred embodiment, the highly elastic layer 14 or foil 15 is about 0.1 mm thick when viewed perpendicularly to the measuring direction X. This ensures that an optimal expansion in the measuring direction X is provided without creating frictional forces which occurred in the prior art devices due to friction between the carrier body 1 and object 5, for example.

Any adhesive that has adequate adhesive strength for bonding to the carrier body 1 and optimally to object 5 and that, after hardening, maintains sufficient internal flexibility in order to provide unhindered, free lengthwise expansion of both housing 1 and object 5 in the measuring direction X is suitable as the adhesive layer 14 and 15.1.

The backing paper of a conventional adhesive film may be used as the slide layer 15.2. For easy removal of the backing film from adhesive layer, the backing film has a relatively low adhesion to the adhesive layer and, as a result, provides a sliding layer with good sliding properties in the measuring direction X. The sliding properties of the backing film may be increased by coating the backing film with silicone, oil or TEFLON.

While this invention has been shown and described in connection with the preferred embodiments, it is apparent that certain changes and modifications, in addition to those mentioned above, may be made from the basic features of the present invention. Accordingly, it is the intention of the Applicant to protect all variations and modifications within the true spirit and valid scope of the present invention.

What is claimed is:

1. A length measuring instrument for measuring the relative position of a first and second object, the instrument comprising a carrier body, portions of which are fastened to the first object by translatory bearing fasteners, a measurement embodiment fastened to the carrier body, the measurement embodiment extending in a measuring direction, a scanning arrangement fastened to the second object for scanning the measurement embodiment, the improvement comprising:

a support zone located between the first object and an exterior portion of the carrier body for supporting a surface of the carrier body wherein the support zone is formed by a highly elastic layer.

2. A length measuring instrument according to claim 1 wherein the highly elastic layer is an adhesive layer.

3. A length measuring instrument according to claim 1 wherein the highly elastic layer includes an adhesive layer applied to the surface of the carrier body and a slide layer applied to the adhesive layer wherein the slide layer is in contact with the first object.

4. A length measuring instrument according to claim 1 wherein the highly elastic layer is formed by an adhesive foil.

5. A length measuring instrument according to claim 4 wherein the adhesive foil includes an adhesive layer applied to the surface of the carrier body and a slide layer applied to the adhesive layer wherein the slide layer is in contact with the first object.

6. A length measuring instrument according to claim 5 wherein the slide layer is formed by a protective paper.

7. A length measuring instrument according to claim 3 wherein the slide layer is the protective paper of an adhesive foil.

8. A length measuring instrument according to claim 1 wherein the highly elastic layer is applied in strip form running in the measuring direction on the carrier body.

9. A length measuring instrument according to claim 8 wherein the support zone is located spaced from the translating bearing fasteners.

10. A length measuring instrument according to claim 9 wherein the carrier body has an exterior surface extending between the translatory bearing fasteners and the support zone which is not in contact with the first object.

11. A length measuring instrument according to claim 1 wherein the carrier body is a hollow body having an interior and the measurement embodiment is located in the interior of the hollow body in a protective state.

12. A length measuring instrument according to claim 11 wherein the measurement embodiment is fastened to the interior of the carrier body by an elastic layer wherein thermally conditioned length changes in the carrier body are substantially independent of the measurement embodiment in the measuring direction.

13. A length measuring instrument according to claim 1 wherein the carrier body is rigidly fastened to the first object at one location.

14. A length measuring instrument according to claim 1 wherein the highly elastic layer is silicone.

15. A length measuring instrument according to claim 1 wherein the highly elastic layer is about 0.1 mm thick.

16. A method for mounting a carrier body of a length measuring instrument to a first object comprising the steps of:

providing a carrier body having a side surface;

providing a first object having an exterior surface;

applying a highly elastic layer to a side surface of the carrier body; and mounting the carrier body to the first object by contacting the side surface of the carrier body having the highly elastic layer to the exterior surface of the first object.

17. A method according to claim 16 further comprising the step of fastening the carrier body to the exterior surface of the first object with translatory bearing fastening elements at locations separate from the side surface of the carrier body having the highly elastic layer applied thereto.

18. A length measuring instrument for measuring the relative position of a first and second object, the instrument comprising a carrier body, portions of which are fastened to the first object by translatory bearing fasteners, a measurement embodiment fastened to the carrier body, the measurement embodiment extending in a measuring direction, a scanning arrangement fastened to the second object for scanning the measurement embodiment, the improvement comprising:

a support zone located between the first object and an exterior portion of the carrier body for supporting a surface of the carrier body wherein the support zone is formed by a highly elastic layer wherein the highly elastic layer includes an adhesive layer applied to the surface of the carrier body and a slide layer applied to the adhesive layer wherein the slide layer is in contact with the first object.

19. A length measuring instrument for measuring the relative position of a first and second object, the instrument comprising a carrier body, portions of which are fastened to the first object by translatory bearing fasteners, a measurement embodiment fastened to the carrier body, the measurement embodiment extending in a measuring direction, a scanning arrangement fastened to the second object for scanning the measurement embodiment, the improvement comprising:

a support zone located between the first object and an exterior portion of the carrier body for supporting a surface of the carrier body in at least one surface area wherein said support zone is formed by a highly elastic layer extending in a measuring direction between said at least one surface area of said carrier body and a surface of said first object which extends in parallel with said at least one surface area of said carrier.

* * * * *